United States Patent
Evans et al.

(10) Patent No.: US 9,652,617 B1
(45) Date of Patent: May 16, 2017

(54) ANALYZING SECURITY OF APPLICATIONS

(71) Applicant: Amazon Technologies, Inc., Reno, NV (US)

(72) Inventors: Ethan Zane Evans, Snoqualmie, WA (US); David Allen Markley, Bellevue, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 13/926,211

(22) Filed: Jun. 25, 2013

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *G06F 21/56* | (2013.01) |

(52) U.S. Cl.
CPC .............. *G06F 21/57* (2013.01); *G06F 21/56* (2013.01)

(58) Field of Classification Search
CPC ........ H04W 4/00; G06F 21/56; G06F 21/561; G06F 21/562; G06F 21/563; H04L 63/1433
USPC ..................................................... 726/22–25
See application file for complete search history.

(56) References Cited

U.S. PATENT DOCUMENTS

| | | | | |
|---|---|---|---|---|
| 8,224,934 | B1 * | 7/2012 | Dongre ................. | H04L 63/102 709/221 |
| 2006/0075500 | A1 * | 4/2006 | Bertman et al. ................ | 726/24 |
| 2008/0184367 | A1 * | 7/2008 | McMillan ............. | G06F 21/563 726/23 |
| 2012/0042383 | A1 * | 2/2012 | Greene et al. ................... | 726/25 |
| 2012/0110174 | A1 * | 5/2012 | Wootton et al. ............... | 709/224 |
| 2012/0180126 | A1 * | 7/2012 | Liu ....................... | G06F 11/3013 726/22 |
| 2013/0097706 | A1 * | 4/2013 | Titonis et al. .................. | 726/24 |
| 2013/0160126 | A1 * | 6/2013 | Kapoor et al. .................. | 726/24 |
| 2013/0167231 | A1 * | 6/2013 | Raman ................ | H04L 63/1416 726/23 |
| 2013/0212684 | A1 * | 8/2013 | Li et al. .......................... | 726/25 |
| 2013/0254880 | A1 * | 9/2013 | Alperovitch et al. .......... | 726/22 |
| 2013/0333026 | A1 * | 12/2013 | Starink et al. .................. | 726/22 |
| 2013/0347094 | A1 * | 12/2013 | Bettini ................ | H04L 63/0245 726/11 |

(Continued)

OTHER PUBLICATIONS

U.S. Appl. No. 13/926,574, filed Jun. 25, 2013 and entitled "Application Recommendations Based on Application and Lifestyle Fingerprinting".

(Continued)

*Primary Examiner* — Shewaye Gelagay
*Assistant Examiner* — Trong Nguyen
(74) *Attorney, Agent, or Firm* — Thomas | Horstemeyer, LLP

(57) ABSTRACT

In various embodiments, static, dynamic, and behavioral analyses may be performed on an application. A set of code fragments employed by the application may be determined. A set of device resources employed by the application may be determined. An application fingerprint is generated for the application and potentially malicious component and/or behaviors are identified. The application fingerprint encodes identifiers for the set of code fragments and identifiers for the set of device resources.

23 Claims, 6 Drawing Sheets

(56) References Cited

U.S. PATENT DOCUMENTS

2014/0020094 A1* 1/2014 Wang et al. .................. 726/22
2014/0059684 A1* 2/2014 Wyschogrod et al. ......... 726/23

OTHER PUBLICATIONS

U.S. Appl. No. 13/926,234, filed Jun. 25, 2013 and entitled "Recommending Improvements to and Detecting Defects Within Applications".
U.S. Appl. No. 13/926,607, filed Jun. 25, 2013 and entitled "Application Fingerprinting".
U.S. Appl. No. 13/926,656, filed Jun. 25, 2013 and entitled "Application Monetization Based on Application and Lifestyle Fingerprinting".
U.S. Appl. No. 13/926,683, filed Jun. 25, 2013 and entitled "Developing Versions of Applications Based on Application Fingerprinting".
U.S. Appl. No. 13/926,215, filed Jun. 25, 2013 and entitled "Identifying Relationships Between Applications".
U.S. Appl. No. 13/215,972, filed Aug. 23, 2011 and entitled "Collecting Application Usage Metrics".
U.S. Appl. No. 13/555,724, filed Jul. 23, 2012 and entitled "Behavior-Based Identity System".

* cited by examiner

ANALYZING SECURITY OF APPLICATIONS

BACKGROUND

An application marketplace may offer a multitude of different applications, such as mobile applications. For example, the applications may include games, email applications, social networking applications, mapping applications, imaging applications, music playing applications, shopping applications, and so on. Proprietors of application marketplaces may wish to detect malicious application, or "malware" within the application marketplace for security considerations as well as user experience considerations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating profiles of applications, referred to herein as application fingerprinting. An application fingerprint uniquely identifies an application based on, for example, what application programming interfaces (API) it uses, what software libraries, or code fragments, it uses, what hardware devices it accesses, what device resources it employs, typical resource consumption patterns, and/or other characteristics. In some embodiments, the application fingerprint may also identify typical user behavior relative to the application. The application fingerprints may have many uses, including application search, application categorization, defect detection, and so on. In a curated application marketplace, the proprietor of the application marketplace may wish to avoid or prevent the distribution of applications containing malicious code to the users of the application marketplace. Accordingly, embodiments of the present disclosure can analyze the application fingerprints of applications as well as usage data associated with applications to identify malicious behavior. Additionally, embodiments of the present disclosure can also analyze the application fingerprints of applications and certify that an application distributed via the application marketplace is employing best practices such that the application is not likely to contain malicious code.

Figure 1:
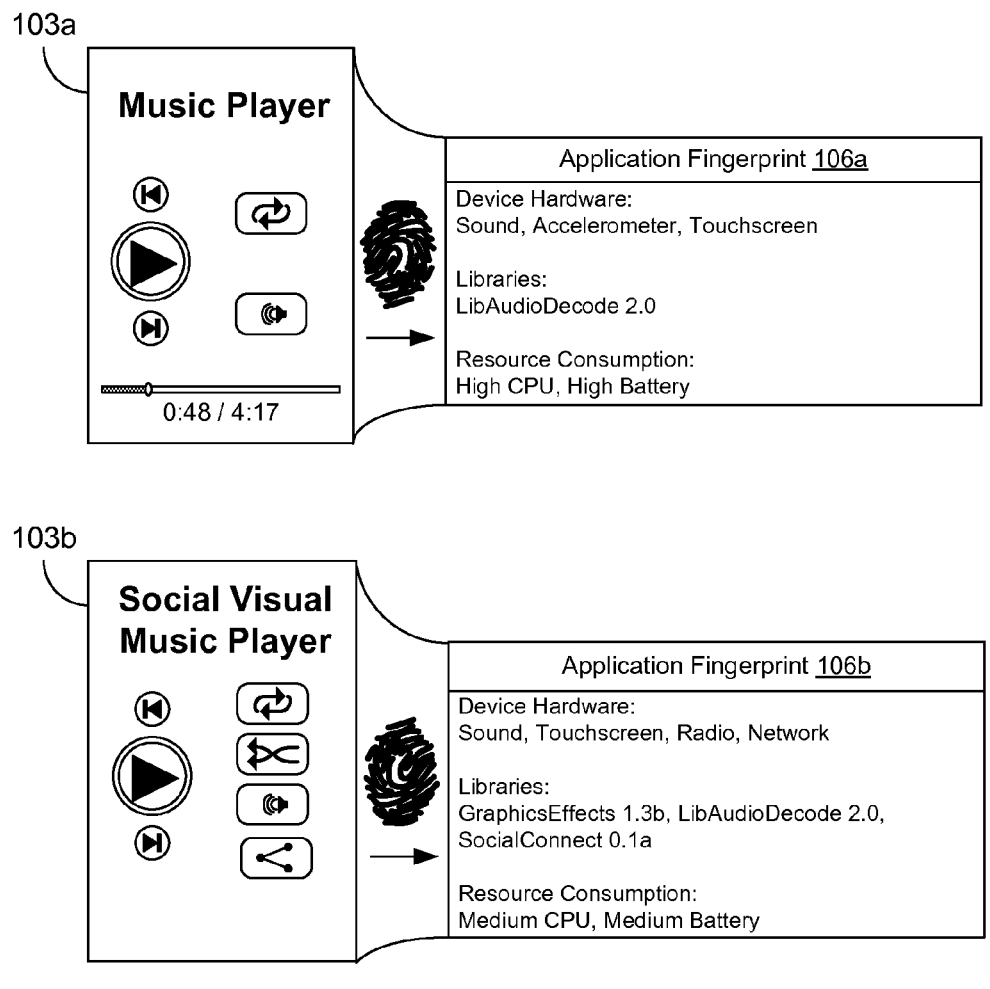
FIG. 1 is a drawing of an exemplary application fingerprint scenario according to various embodiments of the present disclosure.

With reference to FIG. 1, illustrated is a fingerprint scenario 100 according to various embodiments of the disclosure. More specifically, the fingerprint scenario 100 illustrates applications 103a and 103b for which corresponding application fingerprints 106a and 106b are generated. The applications 103 are representative of the multitude of applications 103 that may be offered by an application marketplace. In this non-limiting example, the application 103a corresponds to a music player and the application 103b corresponds to another music player that may have varying and/or additional features relative to the application 103a. Each of the applications 103 has its own respective application fingerprint 106 that can function to distinguish one application 103 from another and/or to identify similarities between applications 103. Accordingly, in the non-limiting example of FIG. 1, each of the application fingerprints 106 identifies characteristics relating to device hardware used, software libraries or code fragments used, and resource consumption. In other examples, additional or different characteristics may be represented by the application fingerprints 106.

Here, the application fingerprint 106a indicates that the application 103a uses the accelerometer and touchscreen of the device and the software libraries including "LibAudioDecode 2.0." Also, the application 103a is associated with high processor and battery usage. The application fingerprint 106b indicates that the application 103b uses a sound device, the touchscreen of the device as well as radio and network capabilities of the device. The application fingerprint 106b also indicates that the application 103b uses the software libraries named "GraphicsEffects 1.3b," and "LibAudioDecode 2.0," and "SocialConnect 0.1a." The application 103b is associated with medium processor and battery usage.

In the depicted example, one or more of the software libraries or code fragments employed by an application 103a and/or 103b can be associated with a known malicious behavior. Accordingly, embodiments of the disclosure can identify the application 103a and/or 103b as a malicious application if the application fingerprint 106a and/or 106b indicates that the application 103 employs a known malicious software library or code fragment. Additionally, embodiments of the disclosure can perform an analysis of the behavior of the application to assess whether the application 103 should be designated as a potential malicious application. In the following discussion, a general description of the system and its components is provided, followed by a discussion of the operation of the same.

Figure 2:
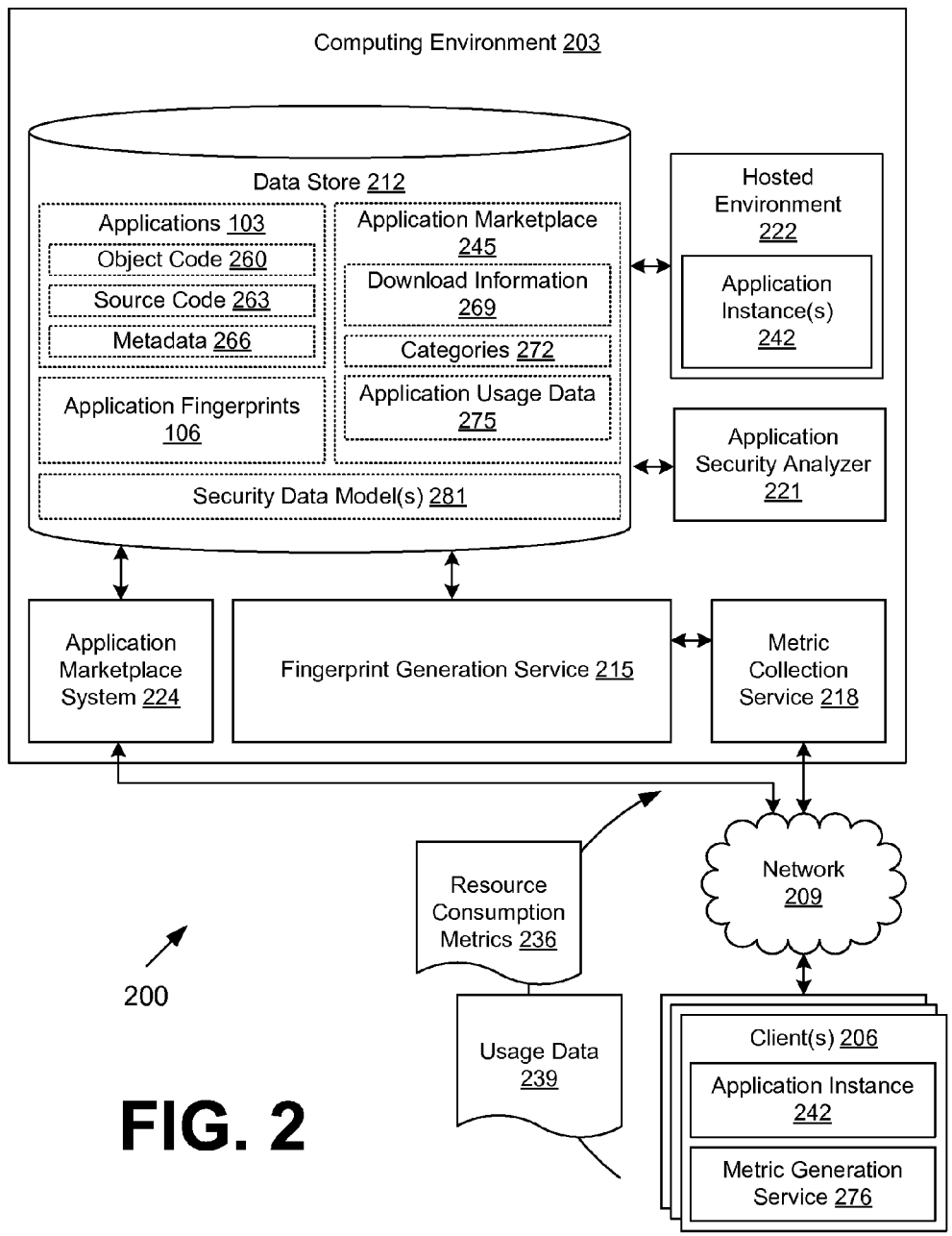
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a fingerprint generation service 215, a metric collection service 218, an application security analyzer 221, a hosted environment 222, an application marketplace system 224, and other applications, services, processes, systems, engines, or functionality not discussed in detail herein. The fingerprint generation service 215 is executed to generate application fingerprints 106 for applications 103.

Various techniques relating to application fingerprinting are described in U.S. Patent Application entitled "APPLICATION FINGERPRINTING" filed Jun. 25, 2013 under Ser. No. 13/926,607; U.S. Patent Application entitled "APPLICATION MONETIZATION BASED ON APPLICATION AND LIFESTYLE FINGERPRINTING" filed Jun. 25, 2013 under Ser. No. 13/926,656; U.S. Patent Application entitled "DEVELOPING VERSIONS OF APPLICATIONS BASED ON APPLICATION FINGERPRINTING" filed Jun. 25, 2013 under Ser. No. 13/926,683; U.S. Patent Application entitled "APPLICATION RECOMMENDATIONS BASED ON APPLICATION AND LIFESTYLE FINGERPRINTING" filed Jun. 25, 2013 under Ser. No. 13/926,574; U.S. Patent Application entitled "IDENTIFYING RELATIONSHIPS AMONG BETWEEN APPLICATIONS" filed Jun. 25, 2013 under Ser. No. 13/926,215; and U.S. Patent Application entitled "RECOMMENDING IMPROVEMENTS TO AND DETECTING DEFECTS WITHIN APPLICATIONS" filed Jun. 25, 2013 under Ser. No. 13/926,234; all of which are incorporated herein by reference in their entirety.

The metric collection service 218 is executed to obtain various metrics as for use by the fingerprint generation service 215 in generating application fingerprints 106. Such metrics may include resource consumption metrics 236, usage data, and/or other types of metrics. For example, resource consumption metrics 236 can include an amount of network usage, CPU utilization, memory utilization, or any other aspect about resources consumed by a particular application. For example, the resource consumption metrics 236 can include information about data stored on the client 206 that is accessed by a particular application as well as what the application 103 does with the data. For example, the resource consumption metrics 236 can identify whether an application 103 accesses an address book stored on a device, how much of address book is accessed by the application 103, and whether the application 103 transmits data from the address book to any other server or network location via the network 209. As another example, the resource consumption metrics 236 can also identify whether an application 103 accesses any other files within file system as well as how the application 103 manipulates or uses the accessed files. Additionally, the resource consumption metrics 236 can be linked with a time of day or other clock that is maintained by or accessible to the client 206 and/or computing environment 203.

Additionally, the metric collection service 218 can also obtain usage data 239 associated with a particular application 103 by users of the application marketplace 245 who have installed the application 103. Such usage data 239 can include crash data, or information related to the unexpected termination of an application 103. Usage data 239 can also comprise information about various aspects, features, levels of an application 103 that users of the application marketplace 245 utilize during usage of the application 103. For example, the usage data 239 can include usage time of a user within different levels of a game application, the amount of time a user spends in a particular section of an application relative to other applications, an amount of network traffic originating from the application, or any other usage metric associated with an application 103.

In one embodiment, an application 103 can be instrumented to report usage data 239 to the metric collection service 218. The usage data 239 and/or resource consumption metrics 236 can be stored in the data store 212 and associated with a user account of a user. In other embodiments, the metric collection service 218 is configured to store the usage data 239 and/or resource consumption metrics 236 on an aggregate, non-user identifiable basis. In either scenario, the stored data can be analyzed with respect to various attributes of users, such as demographic categories.

Various techniques relating to collecting behavioral usage metrics and/or usage data 239 from applications 103 are described in U.S. patent application Ser. No. 13/215,972 entitled "COLLECTING APPLICATION USAGE METRICS" and filed on Aug. 23, 2011, which is incorporated herein by reference in its entirety. Various techniques relating to profiling user behavior are described in U.S. patent application Ser. No. 13/555,724 entitled "BEHAVIOR BASED IDENTITY SYSTEM" and filed on Jul. 23, 2012, which is incorporated herein by reference in its entirety.

The hosted environment 222 is configured to execute an application instance 242 for use in dynamic analysis and resource consumption profiling by the fingerprint generation service. Additionally, the hosted environment 222 can allow the application security analyzer 221 to examine the behaviors of the application 103 to judge whether the behaviors exhibited by the application 103 can be associated with malicious behavior. To this end, the hosted environment 222 may comprise an emulator or other virtualized environment for executing the application instance 242.

The application marketplace system 224 is executed to provide functionality relating to an application marketplace 245 in which a multitude of applications 103 may be submitted by developers and made available for purchase and/or download by users. The application marketplace system 224 may include functionality relating to electronic commerce, e.g., shopping cart, ordering, and payment systems. The application marketplace system 224 may support searching and categorization functionality so that users may easily locate applications 103 that are of interest. The application marketplace system 224 may include functionality relating to verification of compatibility of applications 103 with various clients 206.

The data stored in the data store 212 includes, for example, applications 103, application fingerprints 106, data relating to an application marketplace 245 and potentially other data. The applications 103 correspond to those applications 103 that have been submitted by developers and/or others, for example, for inclusion in the application marketplace 245. The applications 103 may correspond to game applications, email applications, social network applications, mapping applications, and/or any other type of application 103. In one embodiment, the applications 103 correspond to mobile applications 103 for use on mobile devices such as, for example, smartphones, tablets, electronic book readers, and/or other devices.

Each application 103 may include, for example, object code 260, source code 263, metadata 266, and/or other data. The object code 260 corresponds to code that is executable by clients 206, either natively by a processor or by way of a virtual machine executed by the processor. The source code 263 corresponds to the source for the application 103 as written in a programming language. In some cases, the source code 263 may be generated by way of decompiling the object code 260. The source code 263 may be executable by clients 206 through the use of an interpreter. The metadata 266 may declare compatibility with various clients 206, software libraries used by the application 103, device resources used by the application 103, and/or other information. In one embodiment, an application 103 is distributed as a "package" including the object code 260 and the metadata 266.

Application fingerprints 106 can identify a respective application 103 by its characteristics. In one embodiment, an application fingerprint 106 corresponds to a summarized numerical value. In various embodiments, the application fingerprint 106 may be stored as a string. The application fingerprint 106 may include various unique identifiers for device resources and software libraries that are employed by the application 103. The application fingerprint 106 may indicate resource consumption profiles and/or behavioral usage profiles.

The data associated with the application marketplace 245 includes, for example, download information 269, categories 272, application usage data 275 and/or other data. The download information 269 indicates the popularity, either in terms of absolute number of downloads or in terms of relative popularity, of the applications 103 offered by the application marketplace 245. The download information 269 can also identify users, either individually by a user account and/or on an aggregate basis according to demographic category, that have downloaded a particular application 103. The categories 272 correspond to groupings of applications 103 that may indicate similar applications 103 and may be employed by users to more easily navigate the offerings of the application marketplace 245. Non-limiting examples of categories 272 may include social networking applications 103, mapping applications 103, movie information applications 103, shopping applications 103, music recognition applications 103, and so on.

The security data models 281 may be employed for machine learning purposes. For example, the security data models 281 may be trained via training sets that include applications 103 that contain malicious components, application fingerprints 106 of applications that contain malicious components, as well as through manual confirmation of correct identification malicious applications 103 and/or applications 103 containing malicious components. For example, the detection of applications 103 containing malicious components can be confirmed or overridden by one or more users (e.g., voting obtained from multiple users). Where correct detections are confirmed, the application fingerprint 106, application usage data 275 and/or other information associated with the detection may be employed in the security data models 281 to improve the accuracy of further determinations about malicious applications 103. In other words, the application security analyzer 221 can employ the security data models 281 in a machine learning solution that identifies malicious applications 103 based upon their similarity to and/or difference from data within the security data model 281.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display comprising, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as an application instance 242, a metric generation service 276, and/or other applications. The application instance 242 corresponds to an instance of an application 103 that has been downloaded to the client 206 from the application marketplace system 224. The application instance 242 may correspond to actual use by an end user or test use on a test client 206. The metric generation service 276 is configured to monitor the application instance 242 and report data that the user of the client 206 has elected to share with the metric collection service 218. Such data may include resource consumption metrics 236, behavioral usage metrics 236, and/or other data. The client 206 may be configured to execute applications beyond the application instance 242 and the metric generation service 276 such as, for example, browsers, mobile applications, email applications, social networking applications, and/or other applications.

Next, a general description of the operation of the various components of the networked environment 200 is provided. To begin, an application 103 is received by the computing environment 203. The fingerprint generation service 215 then begins processing the application 103 to generate an application fingerprint 106. Such initial processing may comprise a static analysis, which may compare the object code 260 and/or the source code 263 against identified code fragments 248. Other aspects of such a static analysis which can inform an application fingerprint 106 are described herein The fingerprint generation service 215 may also perform a dynamic analysis of the application 103, which may include executing an application instance 242 for the application 103 in a hosted environment and determining which code paths are taken by the object code 260. Other aspects of such a dynamic analysis which can inform an application fingerprint 106 are described in herein.

The application fingerprint 106 may indicate which of the identified code fragments and/or identified hardware resources are actually used by the application instance 242. Resource consumption metrics 236 and/or usage data 239 may be generated by a metric generation service 276 executed in a client 206. The resource consumption metrics 236 and/or usage data 239 then may be reported back from the client 206 to the metric collection service 218 by way of the network 209, which can analyzed and incorporated into an application fingerprint 106 as well as application usage data 275.

Accordingly, an application fingerprint 106 that has been generated may be used in many different ways. As one example, the application security analyzer 221 is executed to analyze an application fingerprint 106 as well as application usage data 275 to determine whether a corresponding application 103 contains one or more malicious components or is a malicious application. In the context of the present disclosure, a malicious component or malicious application can be identified as an application 103 that violates a policy or best practice that is promulgated by a proprietor of an application marketplace 245.

In some embodiments, the application security analyzer 221 can generate a score on a scale that ranges from "non-malicious" on a first end of the scale to "malicious" on another end of the scale. Upon detection of potentially malicious components within and/or behaviors exhibited by an application 103, the application security analyzer 221 can score the application 103 on such a scale accordingly. If, for example, the application security analyzer 221 fails to detect any malicious components and/or behaviors, such a score for an application 103 can fall towards the "non-malicious" end of the scale. If the application security analyzer 221 detects a large number of malicious components and/or behaviors upon analysis of a particular application 103, such a score can fall towards the "malicious" end of the scale.

Accordingly, the security data model 281 can define to what extent the detection of a potentially malicious component and/or malicious behavior of an application 103 affects such a score of the application 103. Therefore, the application security analyzer 221 can generate a score that indicates a degree of maliciousness associated with the application 103 by consulting the security data model 281. In other words, the application security analyzer 221 can detect whether a particular application 103, based upon an analysis of an application fingerprint 106 associated with the application is potentially malicious based upon the calculated score of the application 103.

In one embodiment, the application security analyzer 221 can determine whether object code 260 or a binary representation of an application 103 contains a symbol table that is obfuscated. Because a symbol table is one way in which functionality of an application 103 can be deduced, obfuscation of a symbol table is often one way in which malicious actors attempt to hide malicious functionality that is within an application. Therefore, an application 103 that contains an obfuscated symbol table can be identified as a malicious application 103.

As another example, the application security analyzer 221 can determine whether an object code 260 or any binary representation of an application 103 that is intended for distribution to clients 206 comprises a packed symbol table. Because a symbol table is one way in which functionality of an application 103 can be deduced, packing of a symbol table is often one way in which malicious actors attempt to hide malicious functionality that is within an application. Therefore, an application 103 that contains a packed symbol table can be identified as a malicious application 103.

As another example, the application security analyzer 221 can determine whether an object code 260 or any binary representation of an application 103 that is intended for distribution to clients 206 comprises a stripped binary. Therefore, an application 103 that comprises a stripped binary can be deemed as a policy of the application marketplace 245 as a type of binary that is associated with a malicious application 103 and identified as a malicious application 103 by the application security analyzer 221. Conversely, the application security analyzer 221 can also identify that an application 103 that comprises an unstripped binary is associated with non-malicious behavior. In some embodiments, the application security analyzer 221 can determine that an application 103 can comprises a binary that includes information aiding in the analysis, debugging and/or decompiling of an application 103 is also associated with non-malicious behavior.

As another example, the application security analyzer 221 can also exercise the various functionality contained within an application by executing an application instance 242 within the hosted environment 222. The application security analyzer 221 can observe the behavior of the application, which includes its attempts to access device resources, its use of network resources, the servers with which the application instance 242 communicates, and determine whether the application instance 242 is exhibiting potentially malicious behavior. If the application 103 exhibits malicious behavior in the hosted environment 222, the application security analyzer 221 can identify the application 103 as a malicious application.

For example, the application security analyzer 221 can determine whether network activity caused by the application does not correspond with user activity within the application 103 based upon an analysis of execution of the application instance 242 within the hosted environment and/or based upon an analysis of usage data 239 obtained from application instances 242 associated with clients 206. For example, if user activity is minimal or non-existent but the application 103 is causing network activity, the application security analyzer 221 can deem the application 103 as potentially malicious. Additionally, if an application 103, based upon an analysis of usage data 239 and/or execution of an application instance 242 within the hosted environment, is accessing known malicious servers via a network, the application security analyzer 221 can designate the application 103 as potentially malicious.

The application security analyzer 221 can also examine the degree of change between versions of an application 103 that are submitted by the application marketplace 245 by a developer of the application 103 and compare the degree of change in an application 103 update with the changes that are identified within release notes that are associated with the update. For example, if release notes provided along with an application 103 update do not identify many changes, but the difference between the object code 260 of the update and the previous version of the application is significant, the application security analyzer 221 can flag the application 103 update as a potential malicious application 103. To analyze release notes associated with a version of an application 103, the application security analyzer 221 can perform a sentiment analysis or any other natural language processing to assess the text contained within release notes associated with the application.

The application security analyzer 221 can also examine the differences between different versions of an application 103 that are provided by a developer for various platforms served by the application marketplace 245. For example, a developer may generate different versions of applications 103 for mobile phones, tablets, personal computers, etc. Accordingly, if the software libraries, device capabilities and/or resource consumption profiles utilized by the various platform versions of the application 103 vary to a significant degree from one another, the application security analyzer 221 can designate the application 103 as a potential malicious application 103.

The application security analyzer 221 can also determine whether different versions of an application 103 that are associated with different platforms of clients 206 behave similarly when executed within the hosted environment 222. Additionally, the application security analyzer 221 can determine whether software libraries or portions of software libraries that are referenced within the object code 260 of the various platform versions of the application 103 that are identified as synonymous with one another are employed in the various platform versions of the application 103. If they are not, then the application security analyzer 221 can determine that the application 103 is a potential malicious application 103 when there is too much variance in functionality between the various platform versions of the application 103.

As another example, the application security analyzer 221 can determine based upon an execution of an application instance 242 within the hosted environment and/or on a client 206 whether a particular application 103 updates itself without going through an approved application update process (e.g., updating via the application marketplace). Accordingly, if a code space or application storage area assigned to a particular application 103 within the hosted environment and/or on a client 206 changes by more than a threshold amount, the application security analyzer 221 can designate the application 103 as potentially malicious.

In some scenarios, the application security analyzer 221 can initiate steps to mitigate the potentially malicious behavior of an application where malicious content or behaviors that can be mitigated or prevented are detected. For example, the application security analyzer can modify the application sandbox in which an application instance 242 is executed to remove the ability of the application 103 to access certain device resources. For example, the application security analyzer 221 can remove the capability of the application 103 to access personal information stored on a client 206 and/or adjust the access of the application 103 to network capabilities of the device.

Additionally, the application security analyzer 221 can adjust the capability of the application 103 to access any other device resource of a client 206, such as hardware sensors, mass storage device, display devices, speakers, microphones and/or any other device capability. For example, if the application security analyzer 221 determines that an application 103 is making potentially malicious use of any device hardware or software capability, the application security analyzer 221 can modify the application sandbox in which the application 103 is executed to remove or restrict the ability of the application 103 to access any such device hardware or software capability.

In some scenarios, the application security analyzer 221 can also patch a version of an application where malicious content that can be repaired is detected. For example, if the object code 260 associated with the application 103 references a known malicious server by a domain name system (DNS) name that is known to be associated with the malicious server, the application security analyzer 221 can replace the reference to the DNS name in the object code 260 with a reference to localhost or a non-malicious DNS name.

Accordingly, a security data model 281 employed by the application security analyzer 221 can take into account one or more of the above factors in assessing whether an application 103 contains a malicious component and/or whether the application is a malicious application 103. Therefore, the application security analyzer 221 can update training sets stored within the security data model 281 as malicious behaviors, malicious components and/or malicious applications 103 are identified so that other applications that may exhibit similar behaviors can also be detected as potentially malicious.

The application security analyzer 221 can also determine whether other applications 103 offered via an application marketplace are potentially malicious when one application 103 that is related to the other applications 103 is detected as potentially malicious by the applications security analyzer 221. Accordingly, if a behavior exhibited by an application 103 and/or component within the application 103 is determined to be potentially malicious by the application security analyzer 221, the application security analyzer 221 can then determine whether other applications 103 that are closely related to the application 103 also incorporate the potentially malicious component and/or behavior.

The application security analyzer 221 can also determine whether an application 103 can be certified as not containing malicious components based at least upon whether the application complies with standards and/or best practices set forth by a proprietor of the application marketplace 245. For example, if the application 103 does not employ a packed and/or obfuscated symbol table, is provided with an unstripped binary, employs only approved software libraries, and/or any combination thereof, the application 103 can be certified by the application security analyzer 221 based upon an analysis of the application fingerprint 106 corresponding to the application 103.

Figure 3:
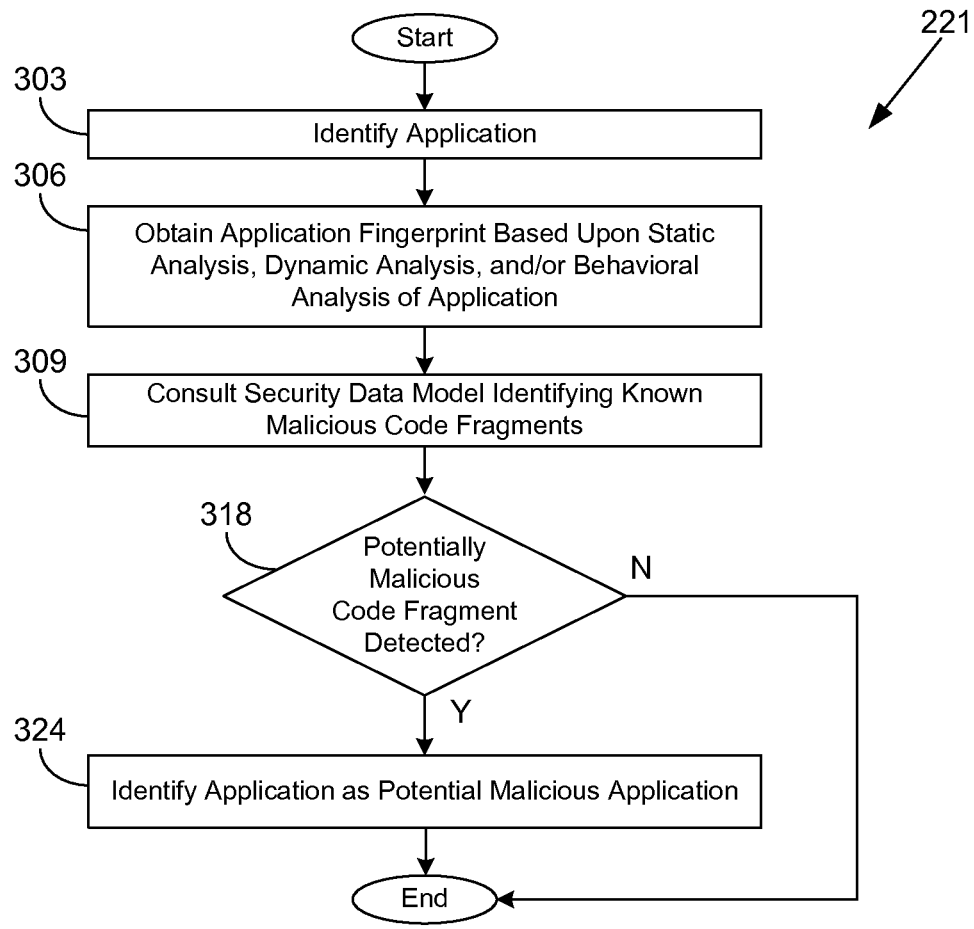
FIGS. 3-5 are flowcharts illustrating examples of functionality implemented as portions of an application analyzer executed in a computing environment in the networked environment of FIG. 2 according to various embodiments of the present disclosure.

Referring next to FIG. 3, shown is a flowchart that provides one example of the operation of a portion of the application security analyzer 221 according to various embodiments. It is understood that the flowchart of FIG. 3 provides merely an example of the many different types of functional arrangements that may be employed to implement the operation of the portion of the application security analyzer 221 as described herein. As an alternative, the flowchart of FIG. 3 may be viewed as depicting an example of steps of a method implemented in the computing environment 203 (FIG. 2) according to one or more embodiments.

Beginning with box 303, the application security analyzer 221 identifies an application 103 (FIG. 1). For example, a developer of an application 103 may wish to have an application 103 evaluated by the application security analyzer 221. Additionally, the application security analyzer 221 may be invoked to analyze applications 103 as they are submitted to the application marketplace 245 for distribution to users. In box 306, the application security analyzer 221 (FIG. 2) can obtain an application fingerprint 106 corresponding to the application 103. In box 309, the application security analyzer 221 can consult a security data model 281 to identify potential malicious components and/or malicious behaviors associated with the application 103. For example, the application security analyzer 221 can determine whether an analysis of object code 260 of the application 103 yields detection of potential malicious components as described above. Additionally, the application security analyzer 221 can also determine whether execution of the application 103 by the hosted environment 222 also yields detection of malicious behavior as described above.

In box 318, the application security analyzer 221 can identify whether the application 103 employs a malicious code fragment and/or software library and can be designated as a potentially malicious application. If a potentially malicious code fragment and/or software library is detected, then at box 324, the application security analyzer 221 identifies the application 103 as a potentially malicious application 103. As noted above, the application security analyzer 221 can generate a risk profile or a risk score and comprises a confidence score expressing a level of risk associated with the maliciousness of the application. Thereafter, the process shown in FIG. 3 proceeds to completion.

Figure 4:
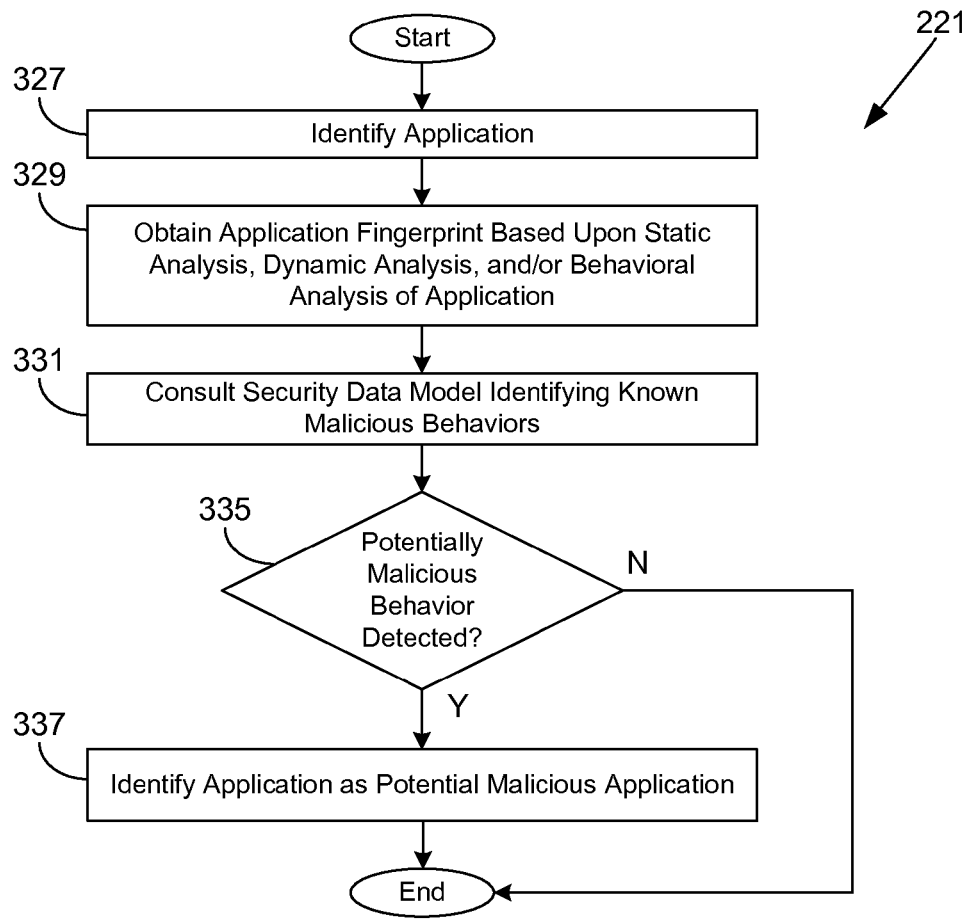

Referring next to FIG. 4, shown is a flowchart that provides one example of the operation of a portion of the application security analyzer 221 according to various embodiments. It is understood that the flowchart of FIG. 4 provides merely an example of the many different types of functional arrangements that may be employed to implement the operation of the portion of the application security analyzer 221 as described herein. As an alternative, the flowchart of FIG. 4 may be viewed as depicting an example of steps of a method implemented in the computing environment 203 (FIG. 2) according to one or more embodiments.

Beginning with box 327, the application security analyzer 221 identifies an application 103 (FIG. 1). For example, a developer of an application 103 may wish to have an application 103 evaluated by the application security analyzer 221. Additionally, the application security analyzer 221 may be invoked to analyze applications 103 as they are submitted to the application marketplace 245 for distribution to users. In box 329, the application security analyzer 221 (FIG. 2) can obtain an application fingerprint 106 corresponding to the application 103. In box 331, the application security analyzer 221 consult a security data model 281 to identify potential malicious behaviors associated with the application 103. For example, the application security analyzer 221 can determine whether an analysis of the application's 103 use of network resources, device resources, personal information stored on a device, or any other aspect of the behavior of the application 103 yields detection of malicious behavior as described above.

If a potentially malicious behavior is detected, then at box 337, the application security analyzer 221 identifies the application 103 as a potentially malicious application 103. As noted above, the application security analyzer 221 can generate a risk profile or a risk score and comprises a confidence score expressing a level of risk associated with the maliciousness of the application. Thereafter, the process shown in FIG. 4 proceeds to completion.

Figure 5:
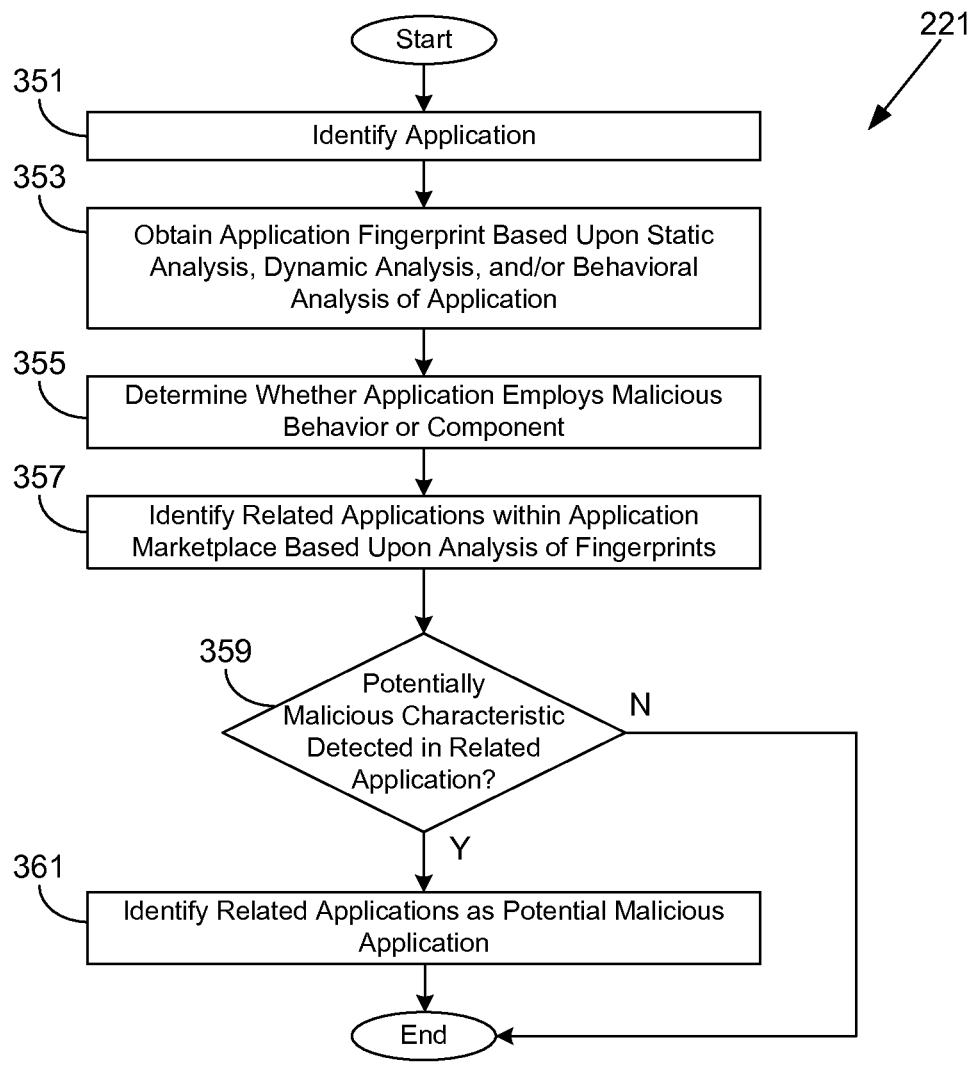

Referring next to FIG. 5, shown is a flowchart that provides one example of the operation of a portion of the application security analyzer 221 according to various embodiments. It is understood that the flowchart of FIG. 5 provides merely an example of the many different types of functional arrangements that may be employed to implement the operation of the portion of the application security analyzer 221 as described herein. As an alternative, the flowchart of FIG. 5 may be viewed as depicting an example of steps of a method implemented in the computing environment 203 (FIG. 2) according to one or more embodiments.

Beginning with box 351, the application security analyzer 221 identifies an application 103 (FIG. 1). For example, a developer of an application 103 may wish to have an application 103 evaluated by the application security analyzer 221. Additionally, the application security analyzer 221 may be invoked to analyze applications 103 as they are submitted to the application marketplace 245 for distribution to users. In box 353, the application security analyzer 221 (FIG. 2) can obtain an application fingerprint 106 corresponding to the application 103. In box 355, the application security analyzer 221 can determine whether the application employs a potentially malicious component and/or malicious behavior as described above. For example, the application security analyzer 221 can determine whether an analysis of the application 103 and/or the application fingerprint 106 of the application reveals a potentially malicious component and/or behavior.

At box 357, the application security analyzer 221 can identify related applications based upon an analysis of the application fingerprint 106 of the application 103 as well as the respective application fingerprints 106 of other applications 103 within the application marketplace. At box 359, the application security analyzer 221 can then determine whether the characteristic or characteristics that are potentially malicious and are detected within the application 103 are also detected within related applications. In other words, the application security analyzer 221 can determine whether the potentially malicious components and/or behaviors that have been detected within the application 103 are also within related applications 103. If so, then at box 361, the related applications 103 exhibiting the potentially malicious components and/or behaviors are identified as potentially malicious. As another example, the application security analyzer 221 can also deem the related applications 103 as potentially malicious if the applications 103 are distributed via an application marketplace by the same developer. As another example, the application security analyzer 221 can deem the most closely related applications 103, or the "nearest neighbors" of the application 103 as potentially malicious applications 103. Thereafter, the process shown in FIG. 5 proceeds to completion.

Figure 6:
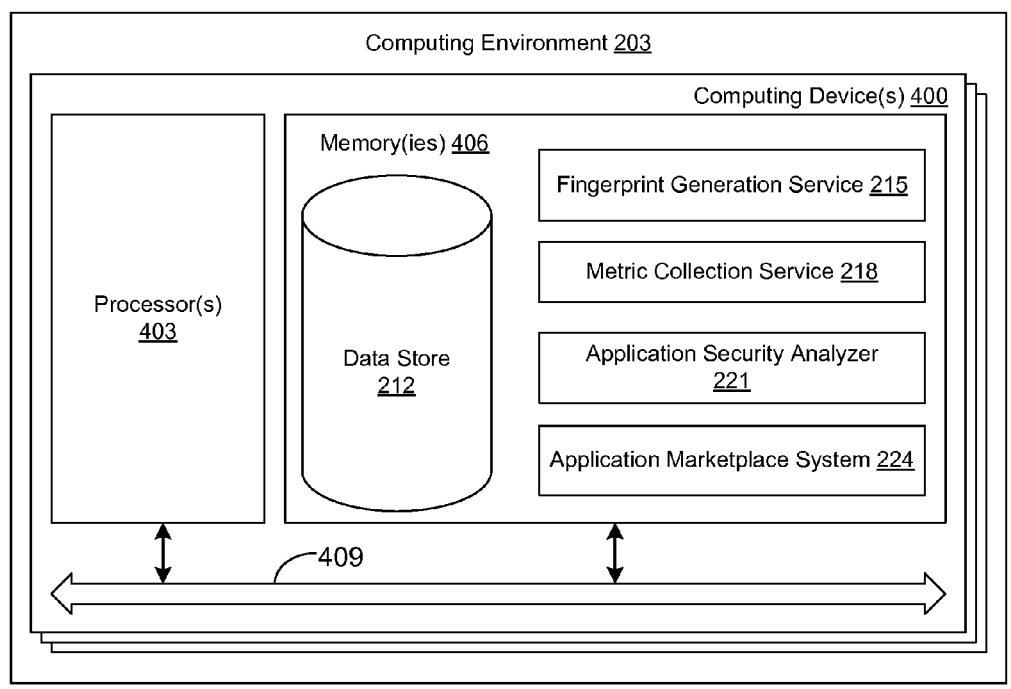
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the fingerprint generation service 215, the metric collection service 218, the application security analyzer 221, the application marketplace system 224, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the fingerprint generation service 215, the metric collection service 218, the application security analyzer 221, the application marketplace system 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3-5 show the functionality and operation of an implementation of portions of the application security analyzer 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIG. 3-5 show a specific order of execution, it is understood that the order of execution may differ from that which is depicted. For example, the order of execution of two or more blocks may be scrambled relative to the order shown. Also, two or more blocks shown in succession in flowcharts of FIG. 3-5 may be executed concurrently or with partial concurrence. Further, in some embodiments, one or more of the blocks shown in flowcharts of FIG. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fingerprint generation service 215, the metric collection service 218, the application security analyzer 221, the application marketplace system 224, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable by at least one computing device, wherein, upon execution, the plurality of computer instructions cause the at least one computing device to at least:

identify an application in an application marketplace;

perform an analysis of the application of a set of code fragments employed by the application and a set of device resources employed by the application;

determine a resource consumption profile employed by the application;

generate an application fingerprint based at least in part upon the analysis of the application, the application fingerprint comprising information about the code fragments, the set of device resources, and the resource consumption profile;

identify a potentially malicious component of the application based at least in part upon a comparison of the application fingerprint with a plurality of other application fingerprints of a respective plurality of other applications in the application marketplace, wherein one of the plurality of other applications comprises a first application designated as a malicious application, another of the plurality of other applications comprises a second application designated as a non-malicious application;

modify an application sandbox in which an application instance is executed to adjust a capability of the application to access a respective device resource from the set of device resources;

generate a score based at least in part upon the application fingerprint, assigning a maliciousness designation to the application in response to the score exceeding a threshold;

identify a related application in the application marketplace based at least in part on a comparison of the application fingerprint with the plurality of other application fingerprints of the respective plurality of other applications; and assign the related application the maliciousness designation in response to a determination that a respective application fingerprint of the related application indicates that the related application comprises the potentially malicious component.

2. The non-transitory computer-readable medium of claim 1, wherein the plurality of computer instructions further cause the at least one computing device to update a malicious component recognition data model in response to receiving a manual confirmation of identification of the malicious component of the application, wherein identifying the potentially malicious component is further configured to identify the potentially malicious component based at least in part on the malicious component recognition data model.

3. The non-transitory computer-readable medium of claim 1, wherein identifying the potentially malicious component is further based at least in part upon identifying the potentially malicious component when one of the set of code fragments employed by the application is associated with a known malicious behavior.

4. A system, comprising:
at least one computing device; and
at least one service executable in the at least one computing device, wherein the at least one service, when executed, causes the at least one computing device to at least:

obtain an application fingerprint for an application in an application marketplace, the application fingerprint based at least in part upon a set of code fragments employed by the application, a set of device resources employed by the application, and a resource consumption profile;

identify a potentially malicious component of the application based at least in part upon the application fingerprint;

modify an application sandbox in which an application instance is executed to adjust a capability of the application to access a respective device resource from the set of device resources;

generate a score based at least in part upon the application fingerprint, assigning a maliciousness designation to the application in response to the score exceeding a threshold;

identify a related application in the application marketplace based at least in part on a comparison of the application fingerprint with a plurality of other application fingerprints of a respective plurality of other applications; and assign the related application the maliciousness designation in response to a determination that a respective application fingerprint of the related application indicates that the related application comprises the potentially malicious component.

5. The system of claim 4, wherein identifying the potentially malicious component of the application is further based at least in part upon a comparison of the application fingerprint with the plurality of other application fingerprints of the respective plurality of other applications in the application marketplace, and one of the plurality of other applications comprises a first application designated as a potentially malicious application and another of the plurality of other applications comprises a second application designated as a non-malicious application.

6. The system of claim 4, wherein identifying the potentially malicious component of the application identifies the potentially malicious component based at least in part upon at least one of: a representation within the application fingerprint of a symbol table of an application binary corresponding to the application, an indication within the application fingerprint that a code fragment associated with the application comprises an obfuscated symbol table, an indication within the application fingerprint that a code fragment associated with the application comprises a packed symbol table corresponding to the application that comprises a stripped binary, or an indication within the application fingerprint that the application binary corresponding to the application comprises a stripped binary.

7. The system of claim 4, wherein identifying the potentially malicious component of the application identifies the potentially malicious component when the application fingerprint indicates that at least one of the set of code fragments corresponds to a known malicious code fragment.

8. The system of claim 4, wherein identifying the potentially malicious component of the application identifies the potentially malicious component when the application fingerprint indicates that the resource consumption profile indicates an anomalous access of a device resource.

9. The system of claim 8, wherein the anomalous access of the device resource comprises an access of more than a threshold percentage of data stored on a mobile device designated as personal information.

10. The system of claim 4, wherein identifying the potentially malicious component of the application identifies the potentially malicious component when the application fingerprint indicates that an application binary corresponding to the application comprises a stripped binary, wherein the stripped binary lacks debugging information associated with the application.

11. The system of claim 4, wherein the at least one service further causes the at least one computing device to alter the application to mitigate a malicious behavior associated with the malicious component of the application by disabling data access for the malicious component.

12. The system of claim 4, wherein identifying the potentially malicious component of the application identifies the potentially malicious component when the application fingerprint indicates that a domain name system (DNS) name embedded within an application binary corresponding to the application comprises a known malicious DNS name.

13. The system of claim 12, wherein the at least one service further causes the at least one computing device to generate a patch associated with the malicious component, the patch being configured to replace the known malicious DNS name embedded within the application binary.

14. The system of claim 4, wherein identifying the potentially malicious component of the application identifies the potentially malicious component when the application fingerprint indicates a variance between network activity exhibited by the application and user activity associated with the application fingerprint exceeds a threshold.

15. The system of claim 4, wherein the score comprises a confidence score associated with a degree of maliciousness of the application.

16. A method, comprising:
    identifying, by at least one computing device, an application in an application marketplace;
    obtaining, by the at least one computing device, an application fingerprint for the application, the application fingerprint based at least in part upon a static analysis of the application, a dynamic analysis of the application, and a behavioral analysis of usage of the application by a plurality of users of the application marketplace;
    determining, by the at least one computing device, that the application is a potentially malicious application based at least in part upon the application fingerprint;
    modifying, by the at least one computing device, an application sandbox in which an application instance is executed to adjust a capability of the application to access a respective device resource from a set of device resources;
    generating, by the at least one computing device, a score based at least in part upon the application fingerprint, assigning a maliciousness designation to the application in response to the score exceeding a threshold;
    identifying a related application in the application marketplace based at least in part on a comparison of the application fingerprint with a plurality of other application fingerprints of a respective plurality of other applications; and
    assigning the related application the maliciousness designation in response to a determination that a respective application fingerprint of the related application indicates that the related application comprises the potentially malicious component.

17. The method of claim 16, further comprising certifying, by the at least one computing device, that the application is a non-malicious application based at least in part upon the application fingerprint by determining that an application binary associated with the application was generated according to a plurality of predetermined practices.

18. The method of claim 17, wherein determining that the application binary associated with the application was generated according to a plurality of predetermined practices further comprises analyzing the application binary to determine whether the application binary was generated using an approved build tool.

19. The method of claim 17, wherein determining that the application binary associated with the application was generated according to a plurality of predetermined practices further comprises determining that the application binary comprises a binary including information aiding in at least one of an analysis or a debugging of the application binary.

20. The method of claim 16, wherein the application fingerprint comprises a first application fingerprint, and wherein determining whether the application is a malicious application further comprises determining, by the at least one computing device, a degree of variance between the first application fingerprint associated with a first application binary associated with the application and a second application fingerprint associated with a second application binary, the second application fingerprint being based at least in part upon a static analysis of the second application binary.

21. The method of claim 20, wherein the first application binary comprises a first version of the application and the second application binary comprises an updated version of the application.

22. The method of claim 21, wherein determining whether the application is a malicious application further comprises:
    comparing, by the at least one computing device, the updated version of the application with a set of release notes associated with the updated version, the set of release notes comprising a description using a plurality of text characters to describe changes made from a prior version of the application; and
    designating, by the at least one computing device, the application as a malicious application when the degree of variance between the updated version and the set of release notes exceeds a predetermined threshold.

23. The method of claim 16, wherein determining, by the at least one computing device, that the application is a potentially malicious application based at least in part upon the application fingerprint further comprises determining an indication within the application fingerprint that a code fragment associated with the application comprises an obfuscated symbol table.

* * * * *